United States Patent [19]
Hurt

[11] 3,767,016
[45] Oct. 23, 1973

[54] BRAKE ACTUATOR AND ADJUSTER MECHANISM

[75] Inventor: Harmon C. Hurt, Dayton, Ohio

[73] Assignee: General Motors Corporation, Detroit, Mich.

[22] Filed: Oct. 30, 1972

[21] Appl. No.: 302,084

[52] U.S. Cl. ......... 188/71.9, 188/106 F, 188/196 D
[51] Int. Cl. ............................................. F16d 65/56
[58] Field of Search ............. 188/71.8, 71.9, 106 F, 188/106 P, 196 F, 196 D, 196 BA

[56] References Cited
UNITED STATES PATENTS

| | | | |
|---|---|---|---|
| 3,244,260 | 4/1966 | Frayer | 188/196 D |
| 3,442,357 | 5/1969 | Farr | 188/196 D |
| 3,688,875 | 9/1972 | De Hoff et al. | 188/71.9 |

Primary Examiner—Duane A. Reger
Attorney—W. S. Pettigrew et al.

[57] ABSTRACT

A disc brake assembly has a caliper frame formed to provide a cylinder housing containing a hollow piston. A second piston is slidable in the hollow piston and mating clutch surfaces are formed on the two pistons so that they are normally engaged. An adjuster nut is splined in the second piston for relative axial movement and axially engages the second piston in force transmitting relation. The adjuster nut is threaded on a screw or shaft which is rotatably journaled in the housing so that rotation of the shaft imparts axial brake actuating movement to the rotationally stationary adjuster nut, the second piston, and the hollow piston. Conversely, axial force exerted on the adjuster nut in the brake actuating direction tends to cause the nut to move rotatably and axially relative to the shaft. A compression spring has one wavy section exerting a preload between the hollow piston and the second piston to axially load the clutch with a force which is less than that required to lock the hollow piston and the second piston together against relative rotation. The spring has another section acting between the hollow piston and the adjuster nut under a preload which urges the adjuster nut into axial force transmitting engagement with the second piston. A brake shoe assembly associated with the hollow piston locks the hollow piston against rotation in the housing, but may be removed so that both pistons and the adjuster nut can be rotated to reset the entire mechanism when new brake linings are installed. The brake may be pressure actuated, with pressure in the housing acting on both pistons. The brake may also be mechanically actuated by rotation of the shaft to move the adjuster nut and both pistons axially in the brake actuating direction. In either case, upon brake release, any slack which had to be taken up during actuation due to lining wear is taken up by rotary and axial movement of the adjuster nut when the brake actuating force transmitted through the clutch decreases until the second piston is permitted to rotate relative to the hollow piston by clutch slippage under influence of the adjuster nut.

4 Claims, 3 Drawing Figures

PATENTED OCT 23 1973 3,767,016

BRAKE ACTUATOR AND ADJUSTER MECHANISM

The invention relates to a brake actuator and adjuster mechanism and more particularly to such a mechanism in a disc brake caliper assembly which provides for pressure actuation during service braking, mechanical actuation for parking, and automatic adjustment for brake lining wear.

It is desirable in an automatic disc brake caliper assembly to provide hydraulic pressure actuation of the brakes for service braking and mechanical actuation of the brakes for parking when the parking brake is provided as a part of the same brake assembly as that of the service type disc brake. It is also desirable to provide an automatic lining wear adjusting mechanism which maintains the brake shoes in close relationship to the disc when the brakes are released so that a minimal amount of brake shoe travel is required to brake the vehicle.

The disc brake caliper assembly in which the invention herein disclosed and claimed is embodied has a pair of pistons connected through a clutch mechanism, one piston being rotatably and slidably received in the other, with spring means normally maintaining the clutch in engagement under an axial preload force which is less than than that required to lock the clutch so as to prevent rotation of the inner piston relative to the outer piston. The outer piston is normally held against rotation at all times during brake operation. An adjuster nut is slidably mounted in the inner piston but is not rotatable relative thereto due to a suitable connection such as a spline arrangement between the adjuster nut and inner piston. The adjuster nut is threaded on a shaft having a high lead screw arrangement, the shaft being rotatable by a parking brake pedal and cable mechanism to move the adjuster nut in the brake actuating direction and transmitting axial force through the pistons and clutch arranegment to actuate the brake. The adjuster nut is also urged axially toward the disc by the spring means under an axial preload force. Upon brake release, whether mechanically or hydraulically applied, the adjuster nut may be moved rotationally and axially by the spring means, with the clutch slipping to permit rotation of the inner piston relative to the outer piston, until the slack, if any, created by brake lining wear is taken up. The mating threads of the screw and adjuster nut are provided with a slight axial clearance, onthe order of 0.006 to 0.008 inches, for example, to permit the pistons and the adjuster nut to move slightly away from the disc to allow for brake lining expansion due to heat.

IN THE DRAWING

Figure 1:
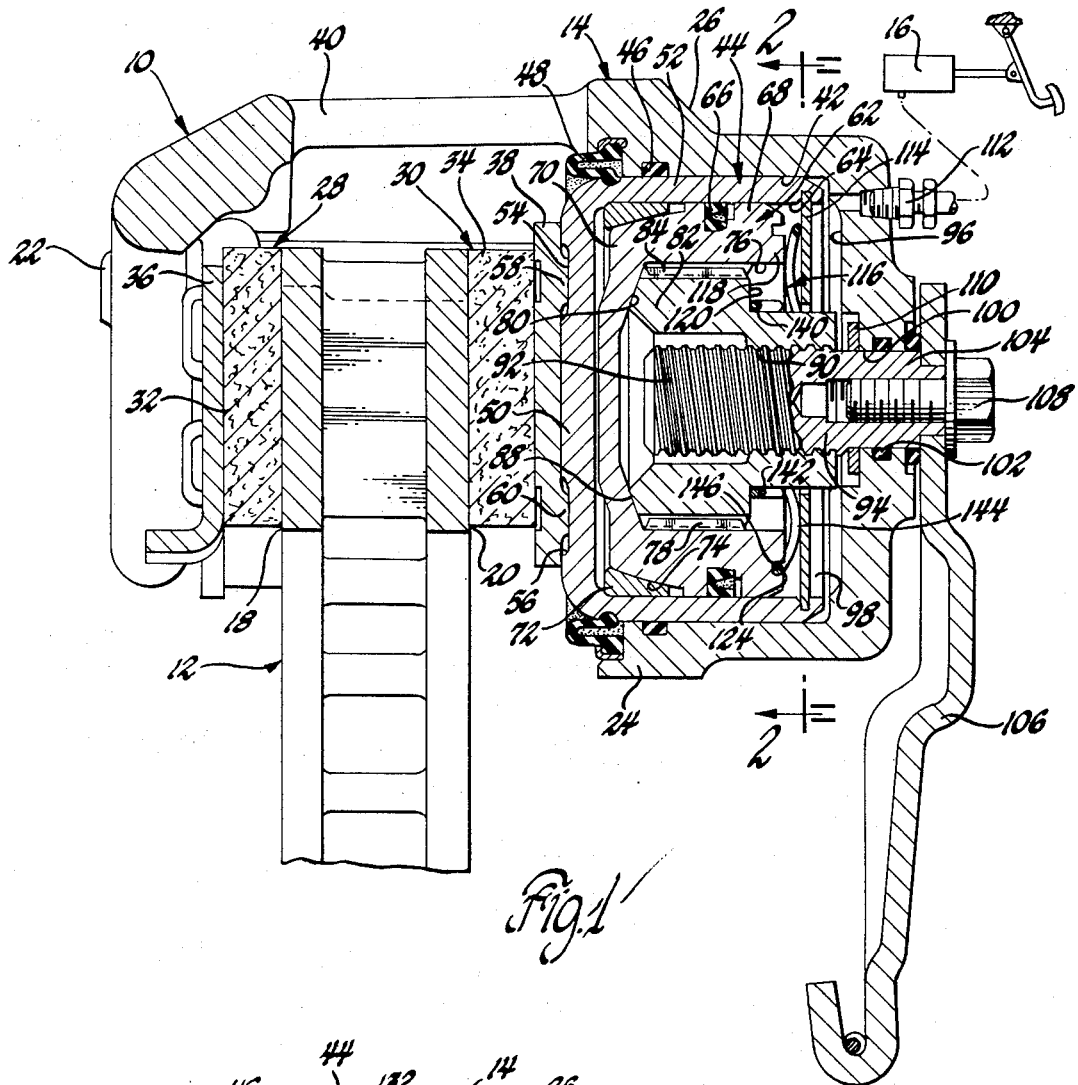
FIG. 1 is a cross-section view of a disc brake caliper assembly embodying the invention.
Figure 2:
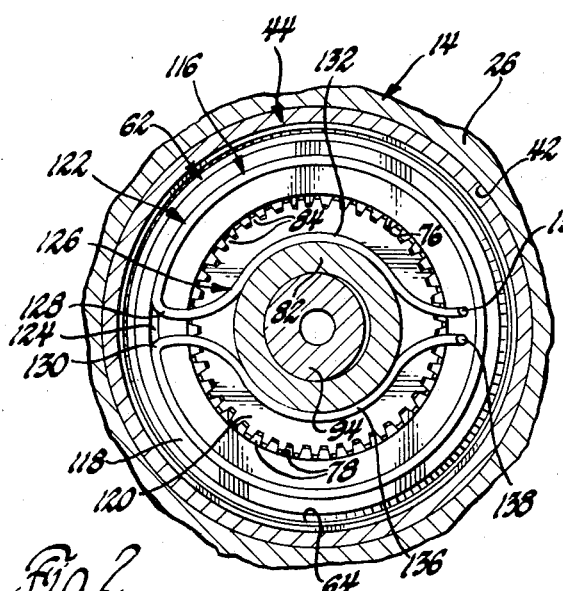
FIG. 2 is a cross-section view of a portion of the brake assembly of FIG. 1 with parts broken away and taken in the direction of arrows 2—2 of that FIGURE.
Figure 3:
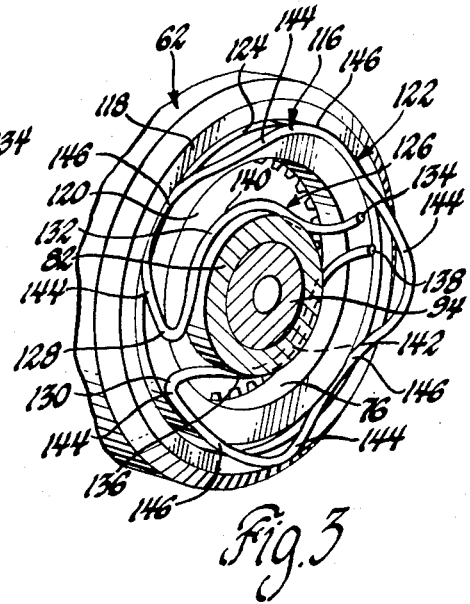
FIG. 3 is a perspective view of the spring used in FIGS. 1 and 2.

The disc brake 10 includes a rotatable disc 12, a caliper assembly 14 and a suitable hydraulic pressure actuating mechanism schematically shown as a master cylinder 16. While the disc brake assembly is of the sliding caliper type, the invention may be used in other types of brake mechanisms.

The disc 12 has opposed friction surfaces 18 and 20 positioned between the opposite legs 22 and 24 of the caliper housing 26. The brake pad assemblies 28 and 30 have brake linings 32 and 34 respectively secured to braking plates 36 and 38 so that the linings are frictionally engageable with the disc friction surfaces 18 and 20. Brake pad assembly 28 is suitably mounted on caliper housing leg 22 so that is is held in position relative to disc 12 and transmits brake torque to the caliper housing. The caliper legs are joined by a bridging section 40 positioned over the outer periphery of the disc 12 and suitably arranged to take brake torque from both brake pad assemblies in a manner well known in the art.

The leg 24 of the caliper housing has a cylinder 42 formed therein and opening toward disc 12. A first piston 44 is received in cylinder 42 for reciprocable and and rotatable movement. A suitable seal 46 is provided to seal brake actuating pressure in cylinder 42, and a boot 48 is provided to seal the outer opening of the cylinder. Piston 44 has a head section 50 which engages the side of backing plate 38 opposite brake lining 34, and a skirt section 52 which extends into cylinder 42. The outer surface of piston head section 50 has depressions 54 and 56 formed therein and receiving bosses 58 and 60 which are formed on backing plate 38. These bosses and depressions prevent rotation of piston 44 in cylinder 42 when the brake pad assembly 30 is installed since the backing plate 38 is provided with extensions on the ends thereof which engage the caliper housing bridging section 40 to prevent circumferential movement of the brake pad assembly in either direction.

A second piston 62 is received within the cylinder 64 formed by the skirt section 52 of the first piston 44 so that it is rotatable relative to the first piston and also axially movable in the cylinder 64. A suitable seal 66 is provided in the outer wall of the skirt section 68 of the second piston 62 and seals against cylinder 64. The second piston 62 also has a head section 70 which is positioned adjacent to head section 50 of the first piston. A clutch element 72, illustrated as a clutch cone seat, is provided within first piston 44 and is suitably secured thereto against rotation. Element 72 is illustrated as having been press fitted in cylinder 62 and is located adjacent the piston head section 50. The second piston 62 has a clutch element 74 formed thereon substantially at the junction of its skirt section 68 and head section 70, the clutch element 74 being illustrated as a clutch cone which mates with the clutch element 72. The entire second piston 62, including clutch element 74 may be referred to as a clutch cone.

The second piston skirt section 68 has a cylinder 76 formed within it, the cylinder wall having axially extending splines 78 formed thereon. The base of cylinder 76 defined by one side of piston head 70 has a force transmitting surface 80 provided thereon so that axial force may be transmitted through the second piston 62 in a manner to be described.

An adjuster nut 82 is received within cylinder 76 of the second piston 62 and has external splines 84 thereon mating with splines 78 so that the nut is movable axially within cylinder 76 but cannot move rotationally relative to the second piston 62. The forward end 86 of nut 82 has an axial force transmitting surface 88 engageable with the force transmitting surface 80 of piston 62. Nut 82 has internal high lead threads 90 and the nut is threaded on the threads 92 of a screw or shaft 94 mounted in the base wall 96 of cylinder 42. Base wall 96 is a part of the caliper housing 26. The threaded portion 92 of shaft 94 extends axially into the chamber 98 defined by pistons 44 and 62, cylinder 42 and its base wall 96.

Shaft 94 is rotatably mounted in the base wall through opening 100, with a seal 102 sealing the opening in the shaft. The outer end 104 of shaft 94 extends outwardly of the housing 26 and has a brake actuating lever 106 secured thereto by suitable means such as bolt 108. A thrust washer 110 is provided on shaft 94 adjacent a portion of the shaft passing through base wall 96 and transmits axial reaction force from the shaft to the base wall. This is the arrangement used when mechanical brake actuation is provided for parking. On brakes without a parking brake requirement shaft 94 may be suitably secured to base wall 96.

A suitable fitting 112 is connected with chamber 98 and to master cylinder 16 to supply hydraulic actuating pressure to the chamber. Other types of pressure supply mechanisms may be provided, depending upon the type of brake operating system being used.

The outer end of cylinder 64 of the first piston 44 has a retainer 114 secured therein, the retainer being a suitable snap ring, for example. A spring 116 engages retainer 114, the end 118 of the second piston skirt section 68, and a shoulder 120 formed on adjuster nut 82. Spring 116 is preferably a marcel spring and has two spring active sections. The outer active section 122 extends circumferentially and is placed axially between the retainer 114 and the skirt end 118. A groove 124 formed in skirt end 118 receives the spring and holds it radially in position. The spring inner active section 126 connects with the spring outer active section 122 at the reverse bends 128 and 130, which are circumferentially adjacent each other. The spring inner section 126 is formed in two parts, one part 132 extending from reverse bend 128 generally chordally and in a smaller circumferential arc than that of outer section 122 and about a portion of the adjuster nut 82 adjacent shoulder 120, terminating in an end 134 which is generally diametrically opposite reverse bend 128 and is radially outward a sufficient distance to engage retainer 114. The other spring inner section part 136 is similarly constructed s that it is positioned radially opposite part 132 and its end 138 also engages retainer 114. The arcuate portions of parts 132 and 136 intermediate the respective reverse bends 128 and 130 and ends 134 and 138 are marcelled so that they provide points of engagement 140 and 142 which engage the surface of shoulder 120 of adjuster nut 82. The spring outer section 122 has similar waves or undulations which provide points of engagement 144 and 146, points 144 engaging the surface of retainer 114 and points 146 engaging the end surface of piston 62.

The spring outer section 122 is preloaded in compression so that it holds the clutch elements 72 and 74 in clutching engagement but with an insufficient axial force to lock the clutch against rotation. When, for example, the clutch cone angle is in the range of 30 to 35 from the piston axis, and in a typical size for use in passenger vehicles, the clutch elements may require a 40 pound axial load to lock against rotation. Therefore, the preload of spring outer section 122 is on the order of 30 pounds.

The spring inner seciton 126 is also axially preloaded to urge adjuster nut 82 axially so that surfaces 80 and 88 are engaged in axial force transmitting relation. As will be seen later, any space occurring between surfaces 80 and 88 during the latter portion of the brake release step reflects the amount of axial slack for which adjustment is provided.

During service brake operation, the brake assembly is actuated by the introduction of fluid pressure into chamber 98 through fitting 112 from a source of brake actuating pressure such as master cylinder 16. This pressure acts on the effective surfaces of first piston 44 and second piston 62 to exert an axial force urging these pistons toward disc 12. Since the clutch 72 and 74 are normally held engaged by spring 116, the axial force is generated by pressure acting on piston 62 is transmitted through the clutch elements to psiton 44 and joins with the axial force generated by the pressure acting on piston 44. These forces are transmitted to the brake pad assembly 30 and the brake lining 34 of that assembly frictionally engages surface 20 of the disc 12. The reaction force generated by the pressure acts on housing 26 to generate a force tending to move the caliper frame in the opposite direction, thereby causing the friction lining 32 of brake pad assembly 28 to engage surface 18 of the disc 12. As the pressure increases, the axial forces applying the brake pad assemblies to the disc also increase, causing the disc to be braked. If the brake linings were worn to any extent, the movement of the pistons 44 and 62 relative to the housing would take up the slack so as to engage the linings with the disc. Also, during increasing pressure and subject to any movement of piston 44 in the brake actuating direction, the inner active section 126 of spring 116 would tend to be further compressed, increasing the axial force on adjuster nut 82 which urges the nut in the brake actuating direction. However, since the axial force exerted through the clutch elements has increased sufficiently to prevent rotation of piston 62 relative to piston 44, the nut 82 cannot rotate the therefore cannot move axially because of its threaded relation with shaft 94. Therefore, an axial space or slack will occur between surfaces 80 and 88 commensurate with the movement required to engage the break shoes with the disc. Some small part of this space may also be contributed by a slight spreading of the caliper legs as well as slight compression of the linings.

Upon release of the pressure in chamber 98, the portions of the created space between surfaces 80 and 88 generated by caliper spread and lining compression will be recovered well before the total axial force through the clutch elements decreases to the point where the clutch is no longer locked. Therefore, the remaining space is primarily the result of brake lining wear after the last brake adjustment. When the axial force falls below that required to keep the clutch locked, the axial force urging nut 82 toward the disc 12, exerted primarily by the preload on spring inner section 126, causes the nut to rotate on the high lead screw threads 92, rotating the second piston 62 with it. The clutch elements slip to permit this rotation. The amount of axial movement is limited to that required to take up the axial space between surfaces 80 and 88, and the adjuster nut 82 is repositioned on shaft 94 slightly closer to the disc than before. Further decrease of pressure in chamber 94 only lessens the force resisting movement of the brake pad assembly and the pistons away from the disc. However, any force tending to push them further away, such as knock-back forces, keep the clutch engaged and the second piston and adjuster nut axially engaged with sufficient force so that the nut is not permitted to move axially away from the disc. Therefore, the new adjusted position is maintained. By providing a small amount of axial clearance between the threads 92 of shaft 94 and the threads 90 of the adjuster nut 82, as discussed above, sufficient space is provided to fully permit disengagement of the linings relative to the disc, even though the linings may have expanded slightly due to heating.

When the brake is mechanically actuated, the parking brake cable 148 is tensioned to rotate shaft 94 by means of lever 106. This rotates the threads 94, moving the nut 82 axially toward the disc 12 with some axial force. Initially, the nut moves axially because there is less resistance to its axial and rotary movement than there is to rotation of the nut and piston 62 at the engagement points of clutch elements 72 and 74. This movement also increases the axial force transmitted through these clutch elements, quickly raising that force above the force required to lock the clutch elements against relative movement. As the shaft 94 continues to be rotated, additional force is exerted in the brake applying direction, and the pistons 44 and 62 and the brake pad assembly 30 are moved to engage the lining with the disc. Reaction to this force is transmitted to the caliper housing through thrust washer 110 so that the force is transmitted through the caliper housing to apply the lining 32 of brake pad assembly 28 to the other side of the disc, actuating the brake. When the parking brake mechanism is released, the reaction force exerted through adjuster nut 82 of the shaft is no longer resisted by cable tension, causing the shaft to rotate toward a brake release position and the adjuster nut moves axially in a direction away from disc 12 to release the brake. The same adjusting action takes place as described above with regard to hydraulic actuation.

When the brake linings wear sufficiently to be replaced, the adjuster nut 82 has moved axially a considerable distance toward the disc 12 on shaft 94. Since brake backing plate 38 holds piston 44 against rotation, the pistons cannot be moved back into cylinder 42 by merely pushing on them. To reset the assembly, the old brake pad assembly 30 is removed, allowing piston 44 to rotate in cylinder 42. The piston is manually rotated, along with piston 62 and adjuster nut 82, to thread the nut back toward base wall 96 on shaft 94. New brake pad assemblies are then installed. Upon the first brake actuation, the adjuster nut is again positioned to hold the proper amount of adjustment, and the brake is operational. Alternatively, the lever 106 may be removed to permit shaft 94 to rotate in opening 100 whicn piston 44 is forced toward the base wall 96. This force causes nut 82 to drive shaft 94 rotationally as the piston and nut are returned axially to the position shown in FIG. 1. New brake pad assemblies are then installed, lever 106 is reattached, and the brake is operational.

What is claimed is:

1. In a disc brake actuator and adjuster mechanism:
p1 a brake actuating piston having a clutch cone rotatably and slidably received therein and a clutch therebetween; an adjuster nut slidably received in said clutch cone; a rotatable brake apply shaft on which said adjuster nut is threaded;
and spring means acting between said piston and said clutch cone with a predetermined preload holding said clutch in engagement, said preload being less than the force reuiqred to lock said clutch against relative rotational movement of said piston and said clutch cone; said spring means also acting between said piston and said adjuster nut with a predetermined preload urging said adjuster nut into axial force transmitting engagement with said clutch cone;
rotating movement of said apply shaft in the brake apply direction increasing the axial force from said adjuster nut to said clutch cone and thereby increasing the clutch means engaging force between said clutch cone and said piston to a force greater than said clutch means locking force to lock said clutch cone to said piston against relative rotational movement and moving said piston to apply the brake;
rotating movement of said apply shaft in the brake release direction removing the brake apply force through said clutch means until the clutch means engaging force is less than said clutch means locking force and said clutch means permits rotating movement of said clutch cone concurrently with said adjuster nut on said apply shaft under the force of said spring means exerted on said adjuster nut to move said adjuster nut axially into engagement with said clutch cone to adjust the brake;
and means subjecting said piston and said clutch cone to brake actuating fluid pressure to apply the brake independently of actuation of the apply shaft.

2. A disc brake actuator and adjuster mechanism comprising:
a cylinder body;
a piston slidably and sealingly received in said cylinder body and having
means preventing piston rotation in said cylinder body and
a clutch cone rotatably and slidably received in said piston and axially engageable therewith in clutching relation;
an adjuster nut slidably mounted in said clutch cone in relative non-rotatable relation and axially engageable therewith in axial force transmitting relation;
a threaded member mounted on said cylinder body and having said adjuster nut threaded thereon;
said cylinder body cooperating with said piston and said clutch cone to define a brake pressure actuating chamber;
spring means acting between said piston and said clutch cone with a predetermined preload holding said clutch cone in clutch-slippable engagement with said piston, said spring means further acting between said clutch cone and said adjuster nut with a predetermined preload urging said adjuster nut toward axial force transmitting engagement with said clutch cone;
and means supplying brake actuating fluid pressure to said brake pressure actuating chamber, said pressure acting on said piston and said clutch cone to actuate the brake and to increase the force holding said clutch cone in engagement with said piston above that required to prevent clutch s'ip, thereby locking said clutch cone against rotary movement relative to said piston;

said spring means, upon release of the fluid pressure in said brake pressure actuating chamber sufficient to decrease the forces holding said clutch cone in engagement with said piston below that required to prevent clutch slip, acting on said adjuster nut to cause rotation of said adjuster nut on said threaded member and thereby rotate said clutch cone relative to said piston and to cause said adjuster nut to move axially to take up any axial slack between said adjuster nut and said clutch cone generated by piston and cone axial movement during brake actuation and to engage said clutch cone axially, thereby adjusting the brake.

3. A brake adjuster for a disc brake comprising:

a normally non-rotatable brake force apply member axially movable in opposite directions to apply and release a disc brake and having a first clutch element thereon;

a second clutch element rotatably and axially movably mounted in said brake force apply member and engaging said first clutch element in clutch-slippable relation and defining therewith a clutch;

a threaded member having an adjuster member threaded thereon for concurrent axial movement and rotary movement thereon, said adjuster member being axially engageable with said second clutch element in axial force transmitting relation;

a spring having a first compression section acting between said brake force apply member and said second clutch element and preloaded to exert an axial force holding said second clutch element in clutch-slippable engagement with said first clutch element, said spring having a second compression section acting between said brake force apply member and said adjuster member and urging said adjuster member toward axial force transmitting engagement with said second clutch element;

and means for actuating the brake by moving said brake force apply member and said second clutch element axially with an increase in axial force through said clutch at least sufficient to lock said clutch against slippage to prevent rotary movement of said second clutch element and said adjuster member relative to said piston, and to release the brake with a decrease in axial force through said clutch sufficient to permit rotary movement of said second clutch element and said adjuster member relative to said piston and to said threaded member under influence of said spring second compression section to cause axial movement of said adjuster member relative to said second clutch element to take up axial slack therebetween until said adjuster member engages said second clutch element in axial force transmitting relation.

4. Disc brake actuating and adjusting mechanism comprising:

a caliper housing having first and second brake pad assemblies positioned on opposite sides of a disc to be braked;

a first piston sealingly slidable in said housing and engaging said first brake pad assembly, said second brake pad assembly being mounted on said housing, and both of said brake pad assemblies being in brake torque transmitting relation to said housing;

means preventing rotation of said first piston in said housing and operable to permit rotation of said first piston in said housing and including at least a part of said first brake pad assembly;

a second piston sealingly slidable in said first piston and cooperating with said frist piston and said housing to define a brake actuating pressure chamber;

clutch means acting between said first and second pistons and being normally engaged to resist rotary movement of said second piston relative to said first piston and providing an axial force transmitting connection between said first and second pistons when engaged;

an adjuster nut normally in axial force transmitting engagement with said second piston;

means axially slidably connecting said adjuster nut and said second piston and preventing relative rotary movement therebetween;

shaft means rotatably mounted in said housing and extending axially into said chamber and threadedly engaging said adjuster nut and generating axial movement of said adjuster nut when rotated to actaute the brake through said pistons and said clutch means;

means for introducing brake actuating fluid pressure into said chamber to urge said first and second pistons toward the disc to actuate the brake;

and a marcelled spring having a first section acting between said first and second pistons and urging said clutch means into engagement with a predetermined preload, and a second section acting between said first piston and said adjuster nut and urging said adjuster nut axially toward axial force transmitting engagement with said second piston;

said spring second section acting upon brake release to move said adjuster nut rotationally on said shaft means and thereby imparting axial movement thereto to axially take up any space between said adjuster nut and said second piston caused by brake wear taken up by axial movement of said first and second pistons during brake actuation;

said first piston rotation preventing means, when operated to permit rotation of said first piston in said housing, permitting concurrent rotation of said first and second pistons and said adjuster nut to thread said adjuster nut on said shaft means axially away from the disc to reset said pistons and said adjuster nut for installation of new brake shoe assemblies.

* * * * *

PO-1050
(5/69)

UNITED STATES PATENT OFFICE
CERTIFICATE OF CORRECTION

Patent No. 3,767,016     Dated October 23, 1973

Inventor(s) Harmon C. Hurt

It is certified that error appears in the above-identified patent and that said Letters Patent are hereby corrected as shown below:

```
Column 2, line 44, the number "62" should read -- 64 --.
Column 3, line 45, "s" should read -- so --;
          line 66, "seciton" should read -- section --.
Column 4, line 15, "psiton" should read -- piston --;
          line 38, "rotate the" should read -- rotate and --.
Column 5, line 13, the number "94" should read -- 92 --;
          line 53, "whicn" should read -- when --;
          line 61, delete "pl".
Column 6, line  2, "reuiqred" should read -- required --;
          line 65, "s'ip" should read -- slip --.
Column 8, line 13, "frist" should read -- first --;
          line 31, "taute" should read -- tuate --.
```

Signed and sealed this 9th day of July 1974.

(SEAL)
Attest:

McCOY M. GIBSON, JR.          C. MARSHALL DANN
Attesting Officer             Commissioner of Patents